UNITED STATES PATENT OFFICE.

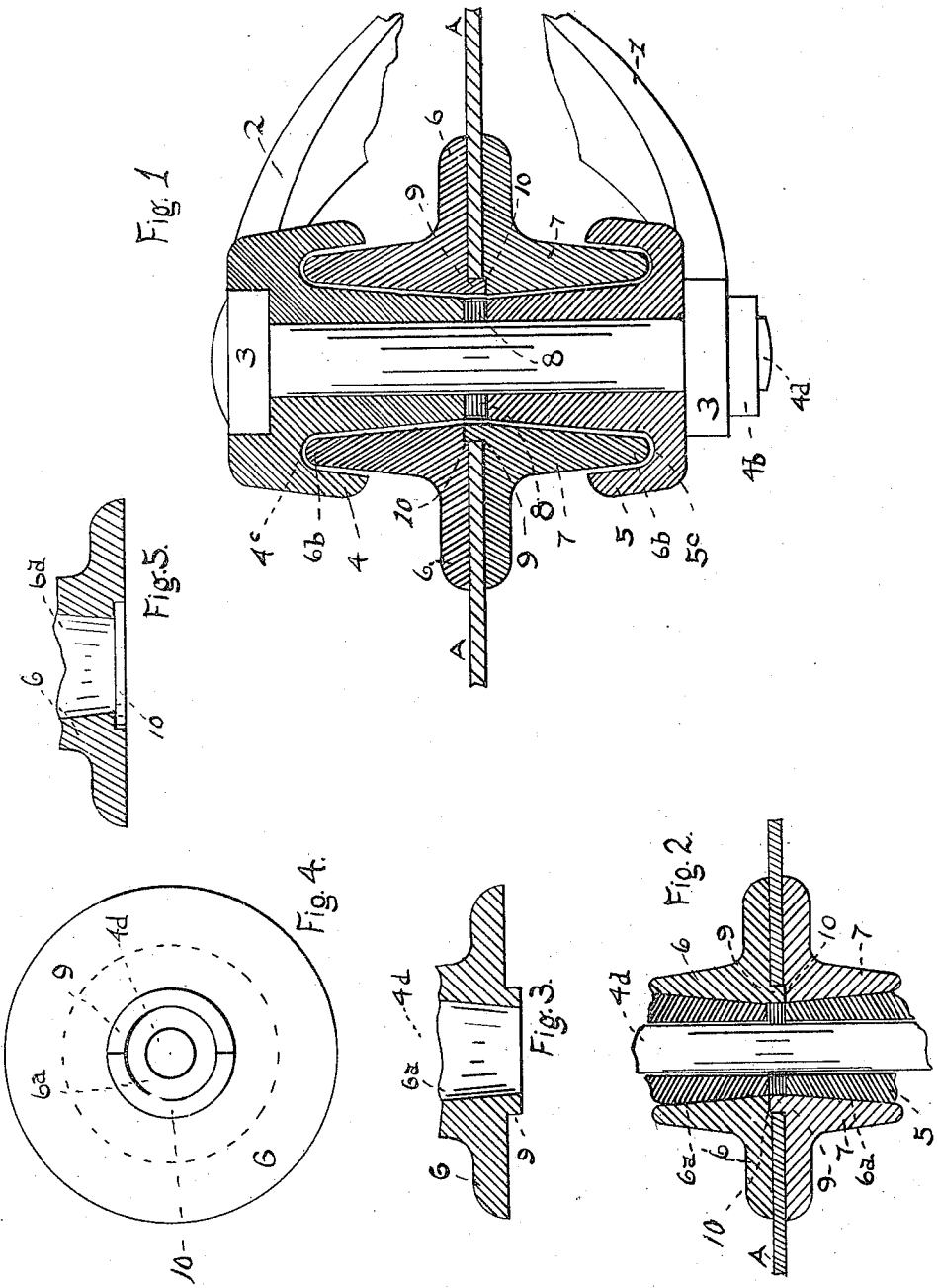

WILLIAM W. CAMERON, OF LA CROSSE, WISCONSIN, ASSIGNOR TO LA CROSSE PLOW COMPANY, OF LA CROSSE, WISCONSIN.

PLOW-COLTER.

1,244,028.   Specification of Letters Patent.   Patented Oct. 23, 1917.

Application filed October 1, 1915. Serial No. 53,597.

*To all whom it may concern:*

Be it known that I, WILLIAM W. CAMERON, a resident of La Crosse, in the county of La Crosse and State of Wisconsin, have invented certain new and useful Improvements in Plow-Colters, of which the following is a full, clear, and exact description.

This invention relates to plow colters.

One object of the invention is to provide means that will overcome the tendency in the forks of colter blades to twist and throw the blades out of true when traveling in the ground.

Another object of the invention is to provide efficient means for taking up wear in the bearings and prevent wabbling of the blade thereon.

Another object of the invention is to provide an improved hub that will be self centering in assembling upon the blade, efficiently coöperate with the bearing, be cheaply produced and reduce the parts necessary for the user to keep on hand for repairs.

The invention consists in the several novel features hereinafter set forth, and more particularly defined by claims at the conclusion thereof.

In the drawings Figure 1 is a vertical sectional view through the center of the hub and bearing of my improved colter seen from the rear, and showing the adjusting washers between the inner ends of the bearing sections. Fig. 2 is a similar view on a reduced scale with the washers omitted and showing a partial view in section of the opposed protruding and recessed half rings of the hub sections. Fig. 3 is a detail in section of one-half of a hub section showing the ends of the protruding half ring and the tapered bearing surface corresponding to the taper of the bearing section. Fig. 4 is a detail in elevation of the inner face of one of the hub sections, showing the protruding half ring and the corresponding recessed half ring. Fig. 5 is a view similar to Fig. 3 but from the opposite direction and showing the recessed half ring.

1 and 2 are the rear ends of the two arms of the fork of a colter adapted to yield under clamping pressure, the forward end being broken away, the socket and shank of the colter not being shown. 3 and 3 are the rear ends of these fork arms respectively, the bolt 4ª passing through both the rear ends. 4 and 5 are the two opposed sections of the bearing, being separated from each other at their inner ends by the spacing washers 8. 6 and 7 are the opposed hub sections, riveted or bolted to the respective sides of the colter blade A. These two sections of the hub are duplicates in construction, the bearing orifice being flared from the end adjacent the colter blade to the outer end of the hub, having a tapered orifice 6ª corresponding to the taper of the bearing section.

Adjacent the center orifice of the hub section is formed a protruding half ring 9, see Figs. 1, 2, 3 and 4, projecting inwardly within the central orifice in the blade A toward the opposed hub section, the inner end of the protrusion being seated within the recess half ring 10 therein. This construction is such that when the inner faces of the duplicate hub sections are brought together the projecting half ring of one section will enter the corresponding recessed half ring of the opposite one, making a practically unbroken surface from end to end of the hub, the opening being tapered outwardly from the center to the outer end, being tapered in each direction from the center to the outer end corresponding to the double taper of the hub. The hub has an end thrust against the grooves 4ᶜ and 5ᶜ in the outer end of the bearing sections respectively by means of the end 6ᵇ of the hub sections as is shown in Fig. 1, as well as taking end thrust by means of the longitudinally opposed tapered surfaces.

It is manifest, as shown in Fig. 1, that the two arms 1 and 2 of the fork are, by means of the bolt 4ª and nut 4ᵇ, the two bearing sections 4 and 5 and the intervening washers 8 fastened rigidly and firmly together, resulting in a solid, unyielding framework that can not be easily sprung out of shape by strains, and upon which the colter blade can be mounted securely, and that if excessive wear occurs the amount of spacing 8 between the ends of the bearing section can be regulated to a nicety by changing the thickness of the intervening washers so as to take up all wear and keep the blade running true and without wabbling, and without binding of the bearing upon the hub.

In the usual means for taking up wear, a center clamping bolt and nut are used to bring some portion of the bearing closer to the hub, but there being no resisting connection between the bearing surfaces except the hub itself, it is almost impossible to secure the nice adjustment desirable to make a good easy running fit, and the fit is either too loose, permitting wabbling of the blade, or too tight, making the blade run too hard or preventing its turning altogether.

The two sections of my improved hub turning upon this rigid bearing are, by means of the protruding half ring and corresponding recessed half ring fitting one within the other made practically as if of one piece with a continuous bearing surface from end to end and are self centering within the orifice of the blade and upon the bearing, and tend to support the blade more securely and truly upon the bearing.

In shop practice but one hub section is made, and in assembling the hub upon the blade one piece is reversed upon the other, saving both the number of different pieces used and space upon the bench of the workmen required by two different hub sections.

The invention is not be understood as restricted to the precise details shown and described, since these can be varied without departing from the spirit and scope of the invention.

Having thus described the invention, what I claim as new and desire to secure by Letters Patent is:

1. In a plow colter, the combination of a fork, a bearing mounted between the arms of the fork, with a colter blade mounted to rotate around the bearing, a hub for the blade comprising sections rigidly secured to the sides of the blade respectively and to each other with portions of each hub section passing through the space between the hub and the orifice of the blade.

2. In a plow colter, the combination of a fork, and a bearing mounted between the arms of the fork, with a colter blade mounted to rotate around the bearing and having a center orifice larger than the diameter of the bearing, a hub for the blade to rotate upon the bearing comprising sections secured to the sides of the blade respectively, orifices within the sections fitting the bearing surfaces, each section of the hub having a laterally projecting half-ring boss passing through the space between the bearing and the orifice in the blade and entering a corresponding recessed half-ring in the face of the opposite hub section.

3. In a plow colter, the combination of a fork, and a bearing mounted between the arms of the fork, with a colter blade mounted to rotate around the bearing and having an orifice larger than the diameter of the bearing, a hub for the blade to rotate upon the bearing comprising sections rigidly secured to the sides of the blade respectively and concentric therewith and having orifices fitting the bearing, each section having a laterally projecting element passing through the orifice in the blade and entering a corresponding recess in the face of the opposite hub section.

4. In a plow colter, the combination of a fork, and a bearing mounted between the arms of the fork, with a colter blade mounted to rotate around the bearing and having an orifice concentric with its axis and larger than the diameter of the bearing, and hub sections secured to the respective sides of the blade, each section being a duplicate of the other and having a protusion entering a corresponding depression in the opposite hub section.

WILLIAM W. CAMERON.

Witnesses:
C. B. SCHOLBERG,
A. J. BRUHS.